United States Patent [19]

Goodsmith

[11] Patent Number: 4,691,429
[45] Date of Patent: Sep. 8, 1987

[54] QUICK DISCONNECT COUPLER

[75] Inventor: Dale H. Goodsmith, Brighton, Mich.

[73] Assignee: Multifastener Corporation, Detroit, Mich.

[21] Appl. No.: 849,323

[22] Filed: Apr. 8, 1986

[51] Int. Cl.$^4$ .............................................. B23P 11/00
[52] U.S. Cl. ...................................... 29/432; 29/818; 227/120; 227/107
[58] Field of Search ................ 29/432, 798, 818; 227/107, 120

[56] References Cited

U.S. PATENT DOCUMENTS

4,153,989  5/1979  Shinjo .............................. 29/818 X
4,505,416  3/1985  Smullegan ....................... 29/818 X

Primary Examiner—Timothy V. Eley
Attorney, Agent, or Firm—Cullen, Sloman, Cantor, Grauer, Scott & Rutherford

[57] ABSTRACT

A quick disconnect system for use in rapidly changing die shoes in a press. The system is adapted for use with a fastener installation head. The system includes a receptacle connected to a supply of fasteners and a power outlet connected to a power means, both mounted in the press, and a fastener plug and power inlet connected to the installation head and mounted in the die shoe. The die shoe is adapted to be mounted adjacent the receptacle and inlet. Upon engagement, fasteners and power are supplied to the installation head. In the preferred embodiment, there are several receptacles located in the press to accommodate any number and location of plugs. In this manner, the die shoes act as a unit and, by fastening a die shoe to the press, fastener supply and power supply are automatically connected to the installation head regardless of the position of the installation heads.

33 Claims, 12 Drawing Figures

QUICK DISCONNECT COUPLER

BACKGROUND OF THE INVENTION

The present invention relates to a system for rapidly changing die shoes in a press, and in particular for rapidly changing die shoes having at least one fastener installation head that is used in installing fasteners in the part being formed.

A conventional press generally has a first die shoe clamped to a ram which is reciprocated with respect to a second die shoe clamped to a base. A blank of material is passed between the die shoes and is stamped into the desired shape by the reciprocating ram. The stamped part is then transferred out of the press and another blank of material is received. Instead of single blanks, a roll of material may be used and continually fed into the press with each successive stamped part being cut from the roll by the press.

In a later station in the press or simultaneously as the part is being formed, one or more fasteners may be pressed into the part. One example of such a fastener is a self-piercing nut as disclosed in U.S. Pat. No. 3,648,747, assigned to the assignee of the instant application and incorporated herein by reference. The self-piercing nut includes a pilot portion which pierces an opening in a panel, a pair of flanges on opposed sides of the pilot having panel-bearing faces and re-entrant grooves in the flange-bearing surfaces adjacent the pilot. Upon forced engagement with the panel, the pilot pierces an opening in the panel and the pierced panel edges are deformed into and retained by the re-entrant grooves.

Preferably, the self-piercing nut is installed by an installation head mounted in one of the die shoes. An example of such an installation head is disclosed in U.S. Pat. No. 4,505,416, which is also assigned to the assignee of the instant invention and incorporated herein by reference. The installation head generally has a stationary member for attachment to a die shoe and a relatively moveable member. The moveable member includes a first passage for receiving the pierce nut and a transverse plunger passage intersecting the first passage. A plunger is connected to the stationary member and projects into the plunger passage of the moveable member in telescopic relation.

Briefly, self-attaching fasteners or pierce nuts are received in the movable member beneath the plunger. When the moveable member engages a panel supported on a pierce or clinch die, the moveable member is moved toward the stationary member, telescoping the plunger in the plunger passages and installing the fastener in the panel.

The installation head is continually supplied fasteners through a chute which is interconnected between the installation head and a supply of fasteners with each installation head requiring a separate chute. The chutes must be threaded through the ram or base and the adjoining die shoe for connection to each installation head. Further, in some applications, power must be supplied to the installation head and related control means, such as control valves.

To remove the die shoe containing the installation heads, each chute and power line must be disconnected and pulled out of the die shoe. With several heads, a die change can be extremely time consuming. Since the press is inoperative during this period, considerable production time is lost.

BRIEF SUMMARY OF THE INVENTION

The present invention provides a quick disconnect system for permitting die shoes to be rapidly changed irrespective of the number and placement of installation heads and control means.

In the preferred embodiment, the quick disconnect system includes a plurality of receptacle means and at least one power outlet mounted in the ram of the press and a plurality of plug means and at least one power inlet mounted in one of the die shoes. The receptacle and outlet are connected to a fastener and power supply respectively and the plug and inlet are connected to an installation head. Upon mounting the die shoe, the plug and inlet mate with the receptacle and outlet to supply fasteners and power to the installation head and controls.

Typically, the part being formed will require several fasteners at various locations with each fastener requiring a separate installation head. The die shoe acts as a unit containing the required installation heads on one face and a like number of plugs and at least one power inlet on the opposite face.

The ram has enough receptacles at various locations for each possible plug location on each different die shoe unit. By mounting the die shoe to the ram, the fastener and power supply are automatically connected to the heads. The receptacles not having a corresponding plug block the advance of fasteners. When a die shoe unit is removed, all receptacles block the advance of fasteners and power is cut off to the inlet. In this manner, the need to route chutes and power lines is obviated permitting the shoe to be changed in a fraction of the time previously required.

In the preferred embodiment, the advance of fasteners is blocked by a spring-biased stop member located in the receptacle. Each receptacle has a flow path which is connected to a chute leading from the fastener supply. The spring biases the stop member into the path when the plug is disengaged and the plug forces the stop out of the path when the plug is engaged.

The receptacle includes a cup-shaped housing having a base, sidewalls and a rim surrounding the mouth of the housing. The housing is preferably cylindrical in shape and the housing is fitted into a countersunk opening in the ram so that the rim is flush with the ram surface.

The receptacle housing reciprocally supports a head member which is biased in the direction of the die shoe and extends past the housing rim. The head member has a recessed surface shaped complementary to the outer surface of the plug. The stop is located at the base of the recess and, upon engagement by the plug is released allowing fasteners to enter a like path in the plug and advance to the installation head. The head member is supported in the housing by a support shaft which is reciprocally supported at the base of the housing. A spring means is connected between the base and the head member to allow the head member to reciprocate within the housing upon engagement of the plug or the die shoe surface when a plug is absent.

The plug includes a cup-shaped housing having a bottom surface and outwardly extending sidewalls which end in a rim. The housing is received within a countersunk opening in the die shoe surface opposite the surface containing the installation heads. A frustoconical shaped plug is mounted to the base of the plug housing and engages the recess in the head member of the receptacle means.

As stated above, the plug means has a flow path; this path extends from the frustum of the plug through the base and is connected to the installation head by a chute. In this manner, the frustum of the plug contacts the base of the complementary-shaped recess and connects the flow paths in the receptacle and plug permitting fasteners to advance from the supply to the installation head. Upon removal of the plug, the stop blocks the passage of fasteners.

To facilitate the positioning of the plug, the head member is supported by the support shaft within a locator ring and locator member which permit the head member to move in any direction within a plane parallel to the ram surface. If the plug is slightly offset, the head member is sufficiently free to move to align the head member with the plug. The locator ring is slidably mounted in the base of the receptacle housing and slides along a straight planar first path. The locator member is received within the locator ring and slides along a straight planar second path perpendicular to the first path. The support shaft is reciprocally connected to the locator member.

In the preferred embodiment, one electrical outlet and one electrical inlet are used to supply power to the various installation heads and control means. The outlet and inlet have cup-shaped housings with a rim about the opening for mounting in countersunk openings in the ram and die shoe respectively. The electrical outlet includes at least one electrical probe extending outwardly from the housing in the direction of the die shoe. A protective pad is reciprocally mounted across the opening of the receptacle and has openings in it for registry with each probe. The pad is biased outwardly to protect the probe and, upon engagement with the inlet means, retracts into the housing, exposing the probe.

The inlet means has a face plate facing the outlet means containing at least one electrical contact. The contact is aligned with the probe and, upon engagement of the inlet means with the outlet means, the protective pad is retracted and the contact and probe engage. Preferably, the probe is connected to a main source of power and the contact is connected to the control means. If there is more than one installation head, which is likely, there will be one probe and contact for each head. The separate probes and contacts may be positioned in a single outlet and inlet or, alternatively, each may be positioned in a separate outlet and inlet.

To ensure good contact between the probe and contact surface, the probes each have two spring-biased prongs that are angled with respect to the horizontal and vertical planes. Upon engaging the contact, the prongs are forced inwardly against a spring bias and wipe across the contact surface.

DETAILED DESCRIPTION OF THE INVENTION

Figure 1:
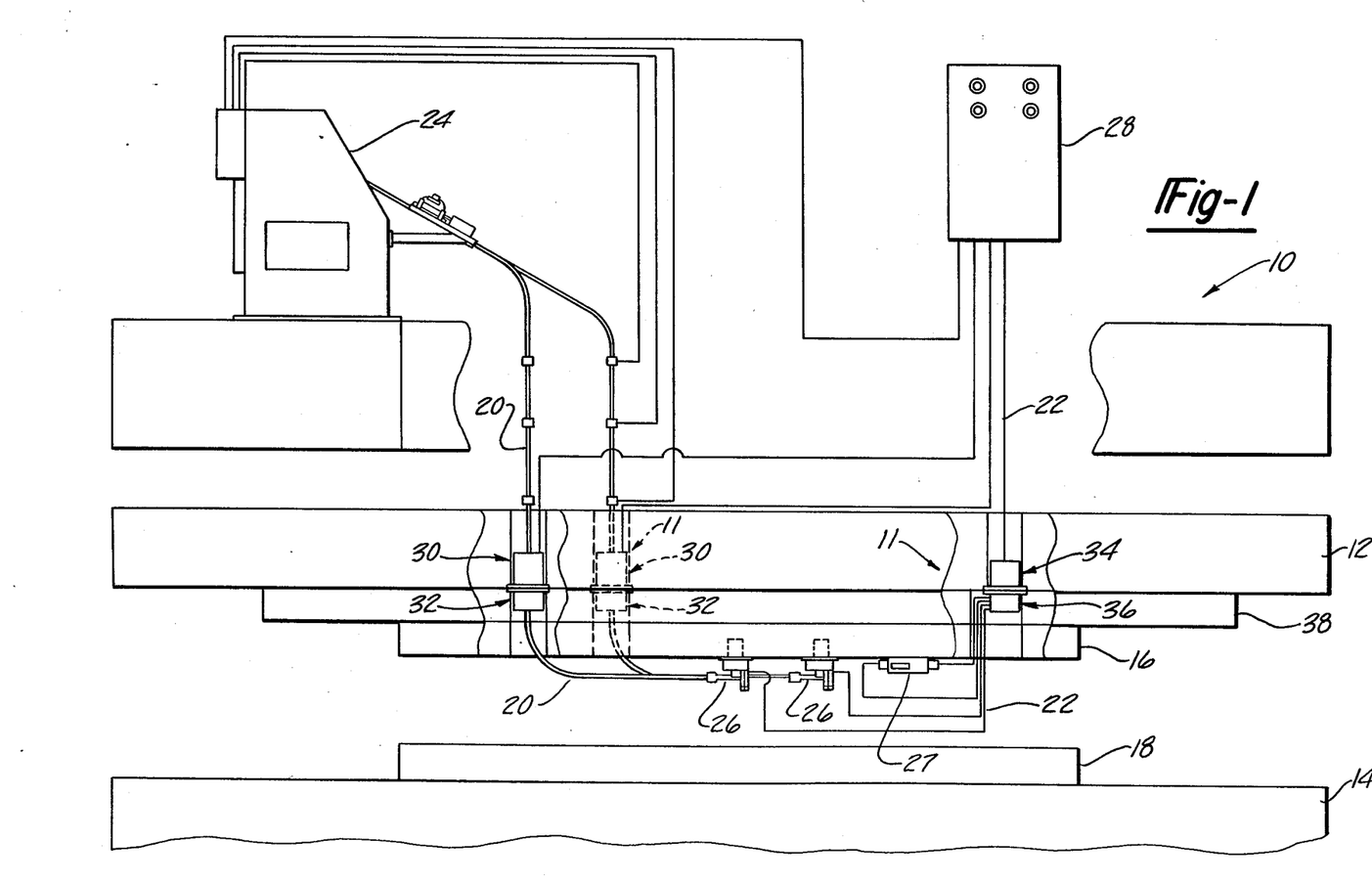
FIG. 1 is a perspective view of the press utilizing the quick disconnect system of the present invention.

With reference to FIG. 1, a typical press is shown generally at 10 having an upper platten or ram 12 and a lower platten or base 14. An upper die shoe 16 is mounted to the ram and a lower die shoe 18 is mounted to the base. The quick disconnect system of the present invention is shown generally at 11 mounted between the ram 12 and upper die shoe 16. In the preferred embodiment, an adapter plate 38 is mounted between ram 12 and upper die shoe 16 to partially receive system 11.

The quick disconnect system 11 includes a receptacle means 30 and outlet means 34 preferably mounted within ram 12 and a plug means 32 and inlet means 36 preferably mounted in adapter plate 38 opposite the stamping surface of die shoe 16. The position of the receptacle and outlet and the position of the ram and plug may be reversed. Receptacle means 30 is connected by a chute 20 to a hopper 24 containing a supply of fasteners, preferably pierce nuts, and outlet 34 is connected by a power line 22 to a power supply 28. Plug 32 and inlet 36 are connected by a chute 20 and power lines 22 respectively to a fastener installation head 26 and a control means 27 operatively mounted adjacent the stamping surface of the die shoe 16.

It should be understood that several installation heads will be used for installing a number of fasteners at various locations on a part. It is intended that each installation head will have a plug 32 and a corresponding or mating receptacle 30 and at least one inlet and outlet 36 and 34. Preferably, a plurality of receptacles 30 will be positioned within ram 12 to mate with plugs 32 of various die shoes. Each die shoe will have a different number of installation head 26 and plugs 32 located at different places along the die shoe. The number of receptacles 30 is predetermined to accommodate the total number of plugs 32. For example, if three different die shoes are intended to be alternately used in a press, each having respectively five, six and nine installation heads, the press will have at least nine receptacles and possibly 20 receptacles to accommodate the plugs. In this manner, no matter which die shoe is mounted on the ram, there are enough receptacles 30 to supply fasteners to the installation heads 26. As will be more fully explained below, the receptacles 30 which are not being used with a specific die shoe will prevent the advance of fasteners and all receptacles will prevent the advances of fasteners during die shoe changes. In this manner, rapid die shoe changes are possible because the die shoe can be mounted to the press and a supply of fasteners and power is automatically provided.

Figure 2:
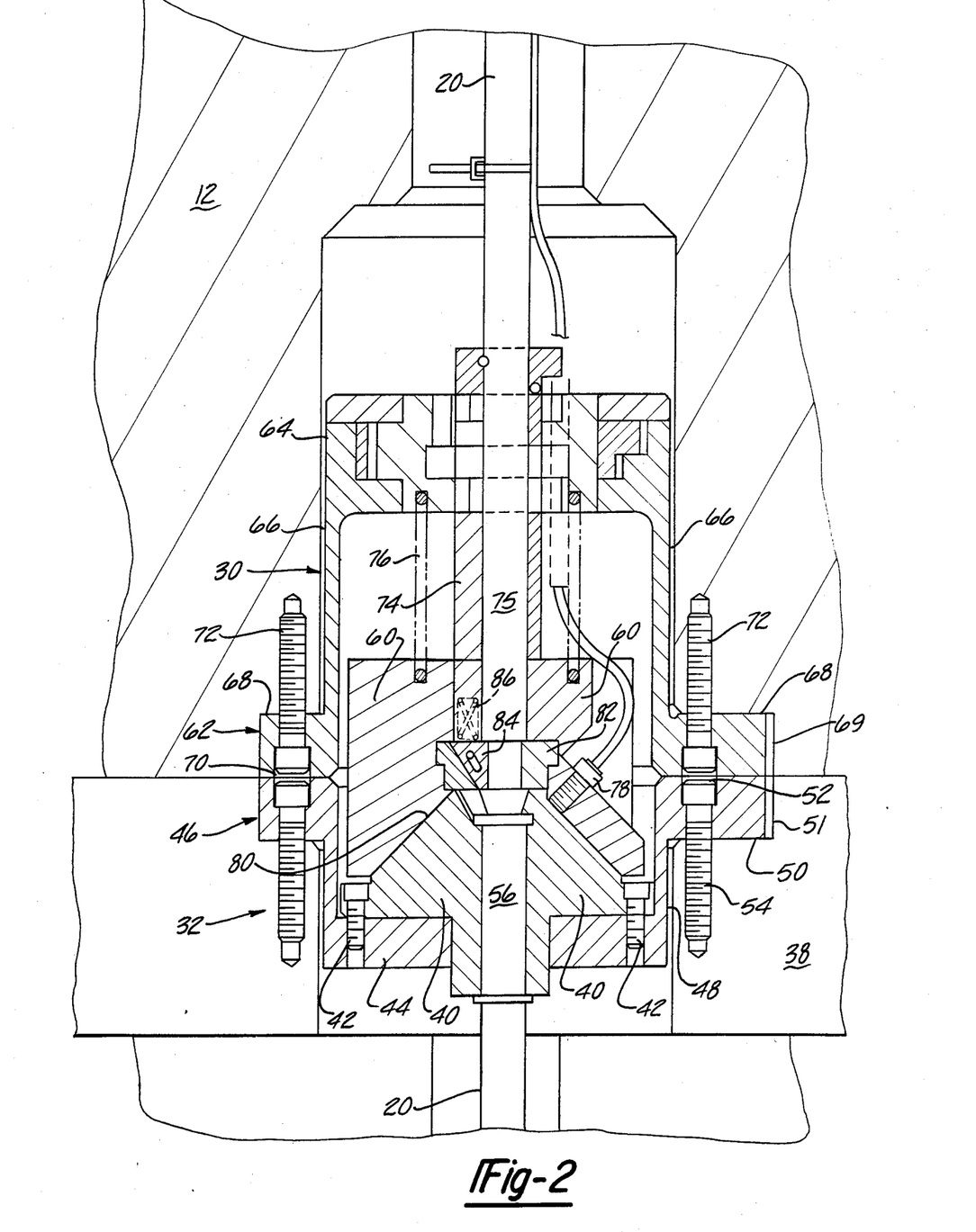
FIG. 2 is a cross-sectional view of the engaged plug means and receptacle means.

With reference to FIG. 2, plug means 32 includes a frustoconical-shaped plug member 40 mounted by machine bolts 42 to the base 44 of a plug housing 46. Housing 46 has cylindrical sidewalls 48 which extend outwardly from base 44 and end in an outwardly extending rim 50. Preferably, housing 46 fits within a countersunk opening in adapter plate 38. Rim 50 has bores 52 for receipt of machine bolts 54 for mounting to adapter plate 38. Keys 51 and 69 are provided on rim 50 to assist in alignment.

An opening 56 extends through the center of plug member 40 and is connected to chute 20 which leads to fastener installation head 26. As will be described below, opening 56 engages a like opening 75 in receptacle means 30 to complete a flow path between hopper 24 and installation head 26.

Receptacle means 30 includes a head member 60 which is reciprocally mounted within a housing 62. Housing 62 has a base 64 and outwardly extending cylindrical sidewalls 66 which end in a rim 68. Housing 62 is received within a countersunk opening formed in ram 12 of press 10. Bores 70 are provided in rim 68 for receipt of machine bolts 72 to fasten housing 62 within the countersunk opening.

Head member 60 is supported upon a shaft 74 and is free to reciprocate within housing 62. Head member 60 is biased outwardly past rim 68 by a spring means 76. In this manner, alignment of plug member 40 is facilitated. Upon engagement with plug member 40 or adapter plate 38, if a plug member 40 is not present, head member 60 is biased against spring 76 into housing 62.

Figures 3, 4:
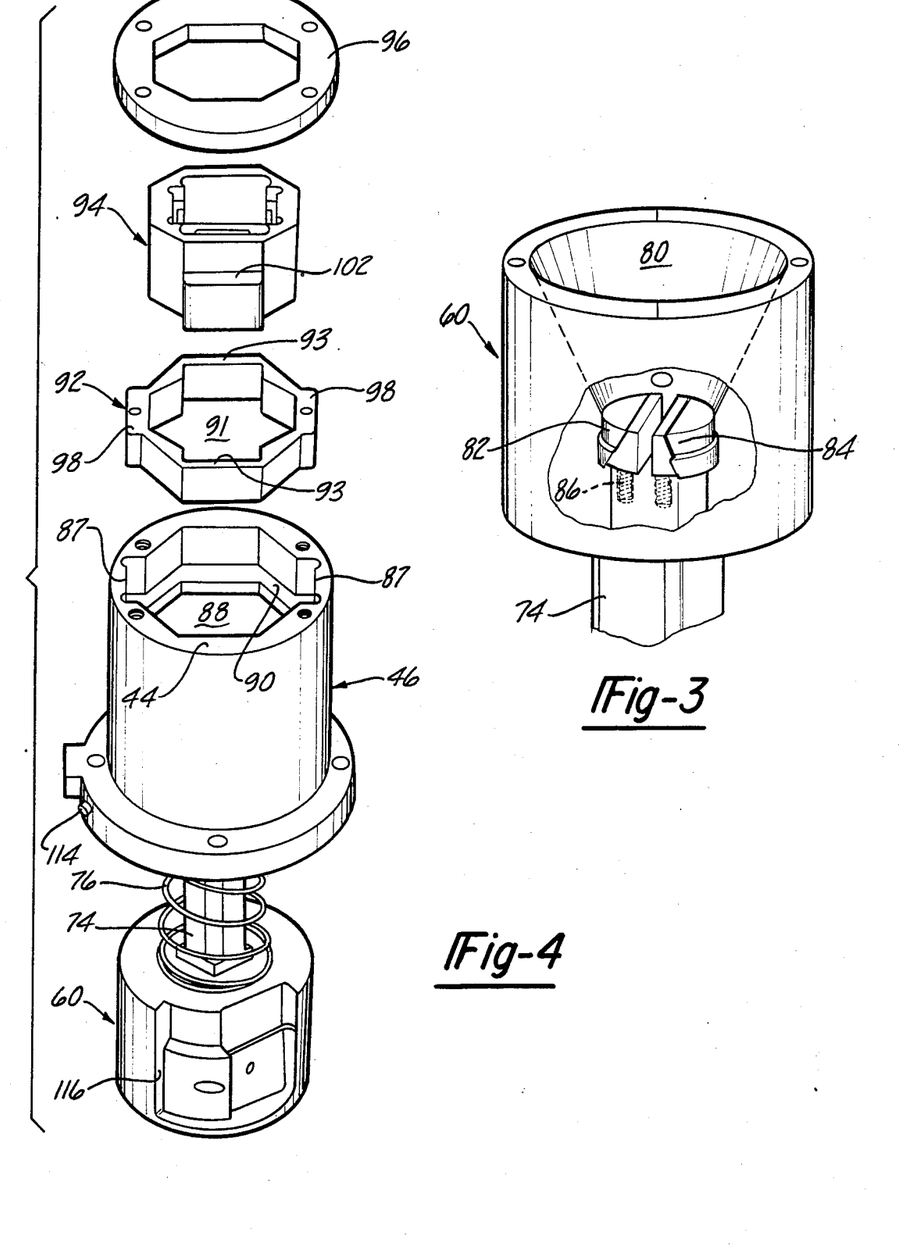
FIG. 3 is a partial cutaway perspective view of the top of the head member.
FIG. 4 is an exploded view of the receptacle means as viewed from the base.
Figure 5:
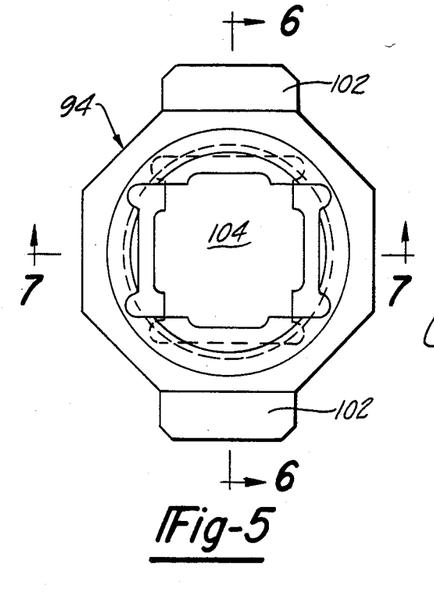
FIG. 5 is a top planar view of the locator member.
Figure 6:
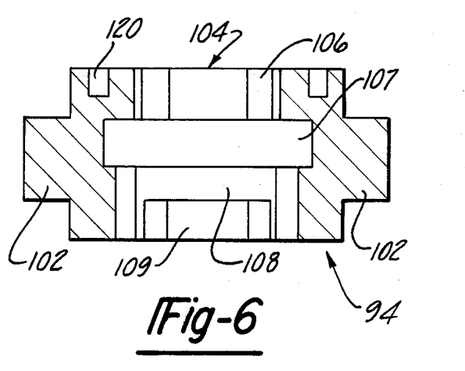
FIG. 6 is a cross-sectional view of FIG. 5 taken along line 6—6.
Figure 7:
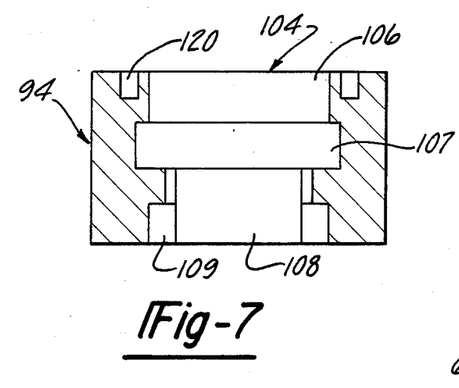
FIG. 7 is a cross-sectional view of FIG. 5 taken along line 7—7.
Figure 8:
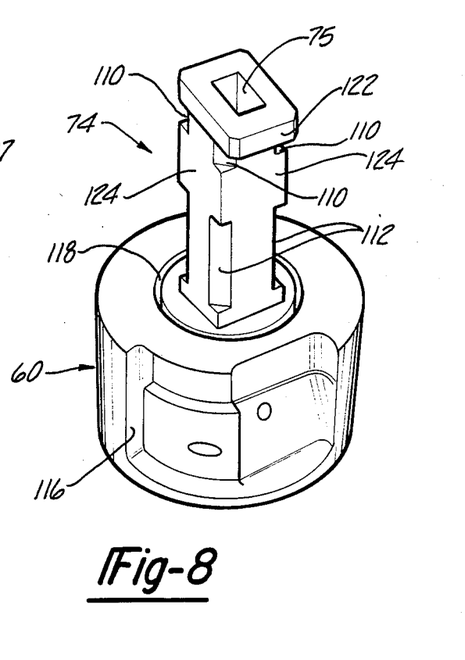
FIG. 8 is a perspective view of the head member and support shaft.

With reference to FIGS. 2 and 3, the surface of head member 60 has a frusto-conical shaped recess 80 for receipt of complementary-shaped plug member 40. Preferably, a probe 78 is positioned within recess 80 to indicate proper alignment of plug member 40. An opening 75 extends through head member 60 and shaft 74 and is connected to chute 20 which leads to hopper 24. At the frustrum of recess 80, a cam guide 82 and cam member 84 are mounted and surround opening 75. Cam member 84 is biased along guide 82 into the flow path of opening 75 by a spring means 86. The frustrum of plug member 40 engages cam member 84 upon engagement with head member 60, forcing cam member 84 to retract against the bias of spring 86 and out of the flow path of opening 75. Thus, upon engagement of plug means 32, the flow path between hopper 24 and installation head 26 is open and the fasteners are free to advance to installation head 26. When plug means 40 is absent, cam member 84 blocks opening 75, preventing the advance of fasteners. To facilitate this action, spring means 86 has less bias than spring means 76.

Referring now to FIG. 4, the manner of supporting shaft 74 in housing 46 will be described. To align die shoe 16 on ram 12, so that each plug member 32 mates with a corresponding receptacle means 30, tolerance must be provided to head member 60 so that it can move slightly to accommodate for slight misalignment. To facilitate alignment, shaft 74 is received within a locator member 94 and locator ring 92 mounted in the base 44 of housing 46. A base plate 96 covers the base of housing 46.

Base 44 has an octagonal-shaped opening 88 with two opposed sides 87 that are wider than the remaining sides and an inner lip or ledge 90. Mounted in opening 88 and resting upon ledge 90 is a locator ring 92 having a substantially octagonal-shaped perimeter with two opposed outwardly extending ears 98. Ears 98 are received in opposed sides 87. Due to wider sides 87, locator ring 92 can freely move along a linear path parallel to the face of ram 12. As viewed in FIG. 2, locator ring 92 can move freely to the left and right but it is prevented from moving in all other directions by the shallower sides of opening 88.

The interior opening 91 of locator ring 92 has an octagonal shape similar to opening 88. However, the wider opposed sides 93 of locator ring 92 are at approximately 90 degrees to the opposed sides 87 of recess 88. Interior opening 91 receives locator member 94 such that ears 102 on locator member 94 are received within opposed sides 93. Locator member 94 is free to slide between opposed sides 93 along a straight planar path perpendicular to the path of locator ring 92. As viewed in FIG. 3, locator member 94 is permitted to slide along a planar path directed from the top to the bottom of the page. Due to the two perpendicular paths of movement, head member 60 can move in any planar direction parallel to the face of ram 12. As should be apparent, movement can only be permitted, for alignment purposes, in a plane parallel to the face of ram 12 because of the necessity of aligning openings 56 and 75. If the openings 56 and 75 are offset, the fasteners will jam as they advance and interrupt operation of press 10.

With reference now to FIGS. 5 through 8, the method of attaching head member 60 to locator member 94 will be described. As discussed, head member 60 must be free to reciprocate within housing 46 and to move in all directions in a plane parallel to ram 12. Head member 60 is fixedly attached, as for example by welding, to shaft 74, which is in turn reciprocally received within a central bore 104 in locator member 94. Bore 104 has four sections. A first section 106 corresponds in shape to the outer perimeter of shaft 74 at a first region 122. During installation, first region 122 is inserted into first section 106 until it bottoms out in a second section 107. In this position, recessed area 110 of shaft 74 is in first section 106 permitting shaft 74 to be rotated 90 degrees. To facilitate this rotation, section 107 is preferably circular in shape. After 90 degrees of rotation, shaft 74 is further inserted until recessed area 112 of shaft 74 is within the third section 108 of member 94. In this position, shaft 74 may be rotated another 90 degrees. Shaft 74 is then seated in fourth section 109 which has a rectangular shape corresponding to the outer perimeter of first region 122 of shaft 74. Second region 124 of shaft 74 is now in third section 108. Third section 108 is rectangular in shape and corresponds to the outer perimeter of second region 124 to prevent shaft 74 from rotating as head member 60 is reciprocated within housing 46.

To facilitate the proper mounting of shaft 74 in locator member 94, a pin 114 is positioned in housing 46, see FIG. 4. During the mounting of shaft 74, pin 114 engages a pin track 116 formed in head member 60. See FIGS. 4 and 8. As shaft 74 is inserted into first section 106, pin 114 is received within pin track 116 and acts as a guide. The base of head member 60 has a spring groove 118 and locator member 94 has a corresponding spring groove 120 for receipt of spring 76.

With reference to FIGS. 9 through 12, the outlet and inlet means 34 and 36 will now be described. Outlet means 34 has a housing 130 similar to the housing of the receptacle and plug means described above. It includes a base 132, cylindrical sidewalls 134 and an outwardly extending rim 136. Preferably, housing 130 is received within a countersunk bore in ram 12. Bores 138 in rim 136 receive machine bolts to fasten housing 130 in ram 12. A guide 164 is provided on rim 136 to aid in aligning housing 130.

Figure 9:
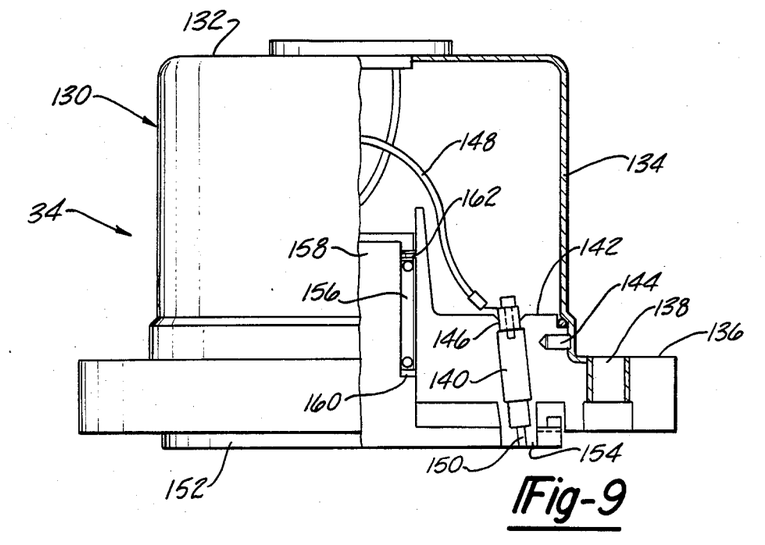
FIG. 9 is a partial cutaway view of the power outlet means.
Figure 10:
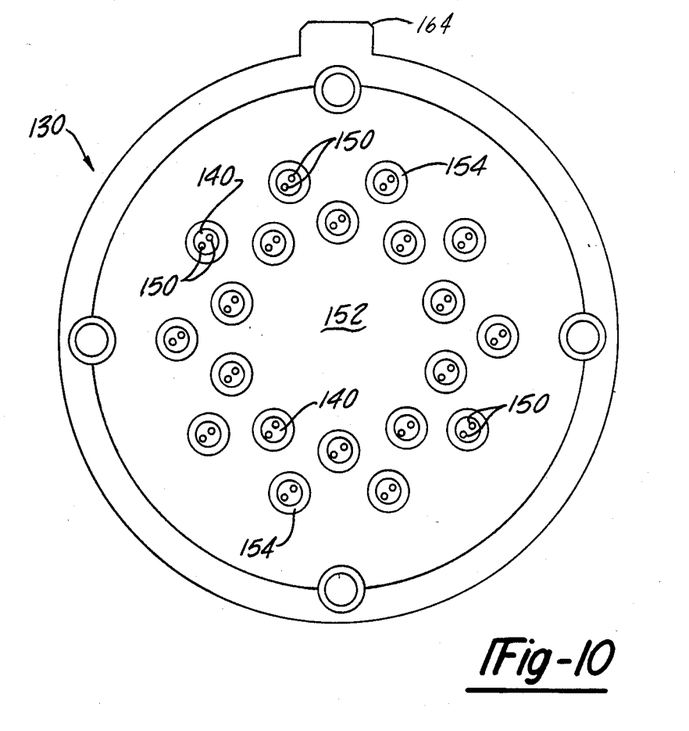
FIG. 10 is a top planar view of the power outlet means.

At least one probe 140 is mounted to the interior of housing 130 via an inner housing member 142. Inner housing 142 is dish-shaped and supported within housing 130 by support pins 144. Inner housing 142 has an opening 146 in which probe 140 is fixedly retained. A power line 148 is fastened to the base of probe 140 and is connected at its opposite end to power supply 28. In the preferred embodiment, there are several probes in the housing which may be used to supply the various installation heads.

Each probe 140 has two prongs 150 which extend outwardly in the direction of inlet means 36. Prongs 150 are angled with respect to the vertical and horizontal planes so that when they engage contacts 176 of the inlet means 36, they wipe across the contact surface. Prongs 150 are spring-biased in probes 140 to facilitate this wiping action.

A protective pad 152 is positioned across the opening of housing 130 and protects probes 140 from damage when the die shoe 16 is being mounted. The protective pad has openings 154 in registry with each probe 140 and is spring-biased by spring means 56 to a position beyond the end of prongs 150. Pad 152 has a central core 158 which is received within an opening in inner housing 142. A spring means 156, as for example a coil spring, is mounted between a ledge 160 on core 158 and a tab member 162 on inner housing 142. Upon engagement by inlet means 36, pad 152 is urged into housing 34 exposing prongs 150 so that they may engage contacts 176.

Figure 11:
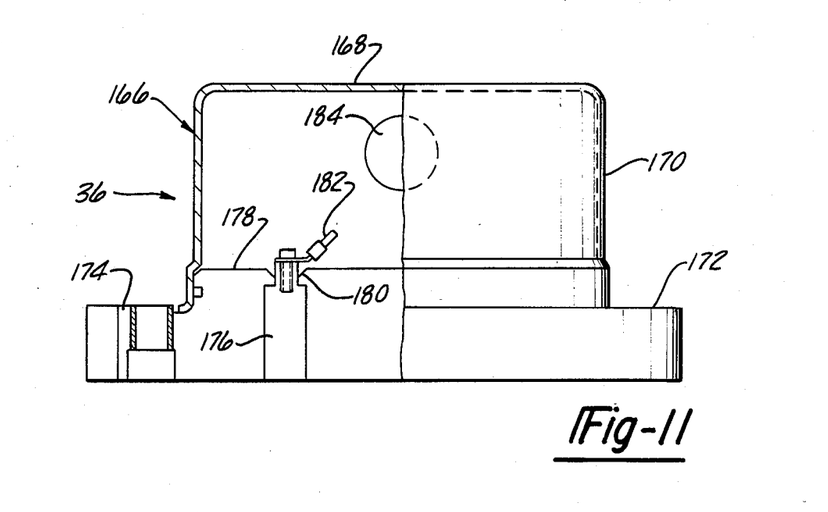
FIG. 11 is a partial cutaway view of the power inlet means.
Figure 12:
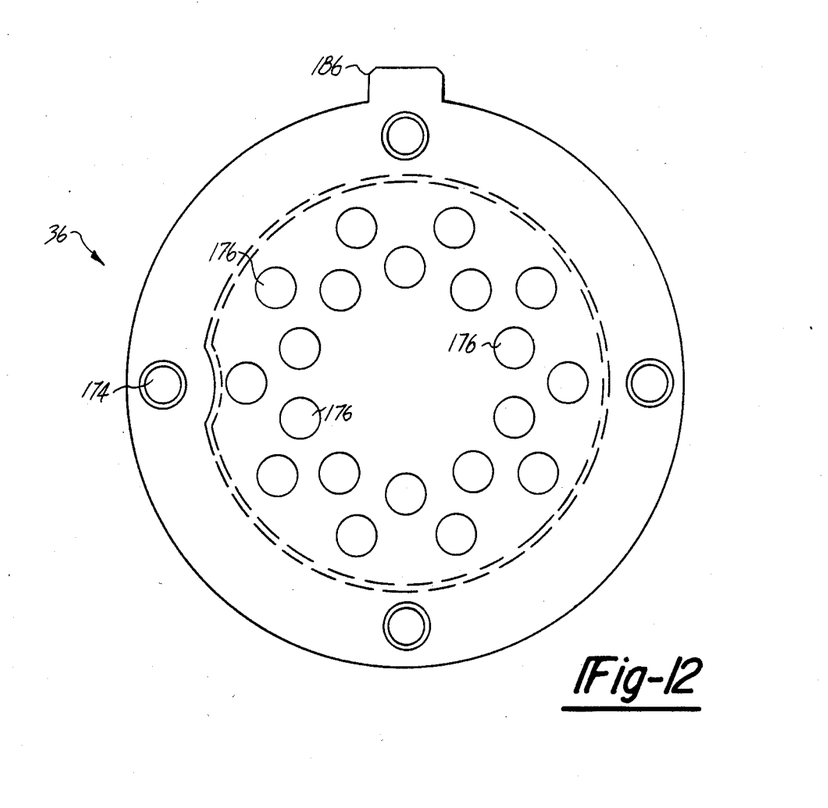
FIG. 12 is a top planar view of the power inlet means.

Inlet means 36 has a housing 166 which is substantially identical to housing 130 of outlet means 34, having a base 168 and outwardly extending sidewalls 170 which end in a rim 172. Bores 174 are provided in rim 172 for receipt of machine bolts to fasten housing 166 in a countersunk opening in the adapter plate 38. A key 186 is provided on rim 172 to assist in alignment.

Positioned within housing 166 and flush with the surface of adapter plate 38 are a series of contacts 176. Contacts 176 are aligned with probes 140 and, upon engagement with probes 140, supply power to the installation heads 26 and controls 27. Contacts 176 are mounted within an inner housing 178 having an opening 180 for registry with contacts 176. A power line 182 is affixed to contact 176 and extends through a conduit opening 184 to connect with installation head 26.

It is within the intended scope of this invention, to have, instead of one outlet and inlet plug for all the installation heads and controls, one inlet and outlet for each installation head. If a single inlet and outlet are provided, they will function in a manner similar to the receptacle means and plug means previously described.

In operation, the die shoes can be rapidly changed by conventional methods without having to disconnect chutes or power lines. They are automatically disconnected upon release of the die shoes from the ram.

The die shoe acts as a complete unit containing a number of installation heads for installing the desired fasteners with corresponding plugs and at least one power inlet means. The unit is selected for the part to be formed and mounted to the ram. Upon mounting, the fastener and power supply are automatically connected to the installation head. In this manner, the necessity of threading chutes and power lines is obviated, reducing down time and increasing production capability.

It will be apparent to those skilled in the art that the foregoing disclosure is explanatory in nature rather than limiting, the invention being limited only by the appended claims.

What is claimed is:

1. A quick disconnect normally interconnecting a source of self-attaching fasteners to at least one installation head, the installation head being mounted within one die shoe of a reciprocal press with a clinch die mounted in the other die shoe opposite the installation head, the press having relatively moveable plattens upon which the removable die shoes are mounted and, upon relative movement of the plattens, the installation head installs fasteners in a panel located between the installation head and the clinch die, the quick disconnect comprising:

a plurality of receptacle means mounted in one of the plattens, the receptacle means having a first fastener flow passage therethrough communicating with the source of self-attaching fasteners;

a plurality of plug means mounted in the one die shoe with at least one of the plug means being coaxially aligned with at least one of the receptacles, each plug means having a second fastener flow passage adapted to communicate between the first passage in the receptacle means and the installation head; and a plurality of closure means each positioned in a respective first passage to close the first passage and prevent the advance of fasteners when a plug means is absent and to open the passage and permit the advance of fasteners when a plug means is present.

2. The quick disconnect of claim 1, wherein the receptacle means and plug means have mating frusto-conical surfaces which positively align both passages in coaxial alignment.

3. The quick disconnect of claim 1, wherein each receptacle means includes a housing having a base and sidewalls;

a head member reciprocally received within the housing, the head member having a first end with a frusto-conical recess therein, the recess facing the plug means; and a support shaft extending outwardly from the opposite end of the head member, a respective first passage extending through the shaft and head member.

4. The quick disconnect of claim 3, wherein each of the closure means includes a cam guide with an inner diagonal wall sloping away form the first passage; the guide being positioned at the frustrum of the frusto-conical recess; and a cam stop having a complementary sloping wall adjacent the diagonal wall, the cam stop sliding into the first passage stopping the passage of the fasteners when the plug means is absent and sliding out of the first passage when the plug means engages the receptacle means freeing the passage of fasteners to the installation head.

5. The quick disconnect of claim 4, wherein the cam stop is spring-biased into the first passage.

6. The quick disconnect of claim 3, further comprising:

a first annular member positioned within the receptacle housing and slidable along a straight planar first path; and a second annular member positioned within the first annular member and slidable along a straight planar second path perpendicular to the first path;

the head member being reciprocally mounted to the second annular member;

whereby the head member is shiftable within the receptacle housing in all directions parallel to and reciprocal with the face of the first die shoe to facilitate location of the plug means.

7. The quick disconnect of claim 1, wherein the plug means includes a housing having a base and sidewalls; and a frusto-conical member mounted to the base;

a respective second passage extending through the housing and the frusto-conical member.

8. The quick disconnect of claim 1, wherein the plug means includes a cup-shaped plug housing having a base and sidewalls and a frusto-conical-shaped plug member mounted to the base of the housing such that the sidewalls extend beyond the frustrum of the plug; the plug housing being countersunk into the surface of the one die shoe; and the receptacle means includes a cup-shaped receptacle housing having a base and sidewalls and a head member reciprocally received within the housing; the head member having a recessed end for receipt of the plug, the receptacle housing being countersunk into the press opposite the one die shoe.

9. The quick disconnect of claim 1, further comprising:

an outlet means mounted in the one platten having at least one electrical probe, the probe extending outwardly from the outlet means in the direction of the one die shoe, the opposite end of the probe being connected to a power source; and an inlet means mounted in the one die shoe, the inlet means having at least one contact aligned with the probe and engagable therewith with the opposite end of the contact being connected to the installation means;

the inlet means engaging the outlet means upon mounting the one die shoe to the one platten therein connecting the power source to the installation means.

10. The quick disconnect of claim 9, wherein the probe has dual prongs extending outwardly in the direction of the contact; each of the prongs being angled in both the vertical and horizontal planes.

11. The quick disconnect of claim 9, further comprising means for protecting the probe;

the means including a pad mounted within the housing having an outer surface parallel to and opposite the inlet means and at least one opening in registry with the probe;

the pad being biased outwardly from the housing, having a first position wherein the outer surface extends beyond the probe to protect the probe from damage; and a second position wherein the pad is urged into the housing upon engagement with the inlet means exposing the probe to the contacts.

12. A quick disconnect normally interconnecting a source of self-attaching fasteners to at least one installation head, the installation head being mounted within one die shoe of a reciprocal press with a clinch die mounted in the other die shoe opposite the installation head, the press having relatively moveable plattens upon which the removable die shoes are mounted and, upon relative movement of the plattens, the installation head installs fasteners in a panel located between the installation head and the clinch die, the quick disconnect comprising:

a plurality of plug means mounted in one of the plattens, each plug means having a first fastener flow passage therethrough communicating with the source of self-attaching fasteners;

a plurality of receptacle means mounted in the one die shoe with at least one of the receptacle means being adapted to align with at least one of the plug means, the at least one receptacle means having a second passage communicating between the first passage in the plug means and the installation head; and a plurality of closure means each positioned in the first passage to close the passage and prevent the advance of fasteners when a receptacle means is not aligned with a plug means and to open the passage and permit the advance of fasteners when a receptacle means is aligned with a plug means.

13. The quick disconnect of claim 12, wherein the receptacle means and plug means have mating frusto-conical surfaces which positively align both passages in coaxial alignment.

14. The quick disconnect of claim 12, wherein each receptacle means includes a housing having a base and sidewalls;

a head member reciprocally received within the housing, the head member having a first end with a frusto-conical recess therein, the recess facing the plug means; and a support shaft extending outwardly from the opposite end of the head member, a respective second passage extending through the shaft and head member.

15. The quick disconnect of claim 14, wherein each of the closure means includes a cam guide with an inner diagonal wall sloping away from the first passage; the guide being positioned at the frustrum of one of the frusto-conical surfaces; and a cam stop having a complementary sloping wall adjacent the diagonal wall, the cam stop sliding into the first passage stopping the passage of the fasteners when the receptacle means is absent and sliding out of the first passage when the receptacle means engages the plug means freeing the passage of fasteners to the installation head.

16. The quick disconnect of claim 15, wherein the cam stop is spring-biased into the first passage.

17. The quick disconnect of claim 15, further comprising:

a first annular member positioned within the receptacle housing and slidable along a straight planar first path; and a second annular member positioned within the first annular member and slidable along a straight planar second path perpendicular to the first path;

the head member being reciprocally mounted to the second annular member;

whereby the head member is shiftable within the receptacle housing in all directions parallel to and reciprocal with the face of the one die shoe to facilitate location of the plug means.

18. The quick disconnect of claim 12, wherein the plug means includes a housing having a base and sidewalls; and a frusto-conical member mounted to the base;

a respective second passage extending through the housing and the frusto-conical member.

19. The quick disconnect of claim 12, wherein the plug means includes a cup-shaped plug housing having a base and sidewalls and a frusto-conical-shaped plug member mounted to the base of the housing such that the sidewalls extend beyond the frustrum of the plug; the plug housing being countersunk into the surface of the one platten; and the receptacle means includes a cup-shaped receptacle housing having a base and sidewalls and a head member reciprocally received within the housing; the head member having a recessed end for receipt of the plug, the receptacle housing being countersunk into the press opposite the one platten.

20. The quick disconnect of claim 12, further comprising:

an outlet means mounted in the one platten having at least one electrical probe, the probe extending outwardly from the outlet means in the direction of the one die shoe, the opposite end of the probe being connected to a power source; and an inlet means mounted in the one die shoe, the inlet means having at least one contact aligned with the probe and engagable therewith with the opposite end of the contact being connected to the installation means;

the inlet means engaging the outlet means upon mounting the one die shoe to the one platten therein connecting the power source to the installation means.

21. The quick disconnect of claim 20, wherein the probe has dual prongs extending outwardly in the direction of the contact; each of the prongs being angled in both the vertical and horizontal planes.

22. The quick disconnect of claim 20, further comprising means for protecting the probe;

the means including a pad mounted within the housing having an outer surface parallel to and opposite the inlet means and at least one opening in registry with the probe;

the pad being biased outwardly from the housing, having a first position wherein the outer surface extends beyond the probe to protect the probe from damage; and a second position wherein the pad is urged into the housing upon engagement with the inlet means exposing the probe to the contacts.

23. A quick disconnect normally interconnecting a source of self-attaching fasteners to at least one installation head, the installation head being mounted within one die shoe of a reciprocal press with a clinch die mounted in the other die shoe opposite the installation head, the press having relatively moveable plattens upon which the removable die shoes are mounted and, upon relative movement of the plattens, the installation head installs fasteners in a panel located between the installation head and the clinch die, the quick disconnect comprising:

a plurality of first housings mounted in one of the plattens, the first housings each having a mating surface with a first fastener flow passage therethrough communicating with the source of self-attaching fasteners;

a plurality of second housings mounted in the one die shoe coaxially aligned with a number of the first housings, each of the second housings having a complementary opposed mating surface with a second passage adapted to communicate between the corresponding first passage in the first housing and the installation head;

each of the housings in one of the plurality of first and second housings having an alignment means and connector member with the connector member interconnecting the mating surface and the alignment means; the alignment means permitting the mating surface to move vertically and horizontally facilitating proper alignment of the mating surface with the opposed mating surface.

24. The quick disconnect of claim 23, wherein the alignment means includes a first annular member moveable along a first linear path; and a second annular member moveable along a second linear path perpendicular to the first path;

the connector member being reciprocally received within the second annular member.

25. The quick disconnect of claim 23, wherein the first and second housings have mating frusto-conical surfaces which positively align both passages in coaxial alignment.

26. A quick fastener disconnect normally interconnecting a source of self-attaching fasteners to at least one installation head, the installation head being mounted within one die shoe of a reciprocal press with a clinch die mounted in the other die shoe opposite the installation head, the press having relatively moveable plattens upon which the removable die shoes are mounted and, upon relative movement of the plattens, the installation head installs fasteners in a panel located between the installation head and the clinch die, the quick disconnect comprising:

a plurality of receptacle means mounted in one of the plattens, the receptacle means having a fastener flow passage therethrough communicating with the source of self-attaching fasteners; and a plurality of plug means mounted in the one die shoe coaxially aligned with a number of the receptacles, each plug means having a passage communicating between a passage in the receptacle means and the installation head;

the plug means engaging the receptacle means when the one die shoe is mounted to the platten press interconnecting the flow paths;

whereby with the one die shoe mounted to the one platten, the source of fasteners is interconnected to the installation head and with the one die shoe removed from the press, the source of fasteners is disconnected from the installation head.

27. The quick disconnect of claim 26, further comprising a plurality of closure means each positioned in a passage to close the passage and prevent the advance of fasteners when a plug means is absent and to open the passage and permit the advance of fasteners when a plug means is present.

28. The quick disconnect of claim 27, wherein each of the closure means includes a cam guide with an inner diagonal wall sloping away from the flow path; the guide being positioned at the frustrum of the frusto-conical recess; and a cam stop having a complementary sloping wall adjacent the diagonal wall, the cam stop sliding into the flow path stopping the passage of the fasteners when the plug means is absent and sliding out of the flow path when the plug means engages the receptacle means freeing the passage of fasteners to the installation head.

29. The quick disconnect of claim 28, wherein the cam stop is spring-biased into the flow path.

30. The quick disconnect of claim 28, further comprising:
a first annular member positioned within the receptacle housing and slidable along a straight planar first path; and
a second annular member positioned within the first annular member and slidable along a straight planar second path perpendicular to the first path;
the head member being reciprocally mounted to the second annular member;
whereby the head member is shiftable within the receptacle housing in all directions parallel to and reciprocal with the face of the first die shoe to facilitate location of the plug means.

31. The quick disconnect of claim 26, wherein the receptacle means includes a housing having a base and sidewalls;
a head member reciprocally received within the housing, the head member having a first end with a frusto-conical recess therein, the recess facing the plug means; and
a support shaft extending outwardly from the opposite end of the head member, the flow path extending through the shaft and head member.

32. The quick disconnect of claim 26, wherein the plug means includes a housing having a base and sidewalls; and
a frusto-conical member mounted to the base;
the flow path extending through the housing and the frusto-conical member.

33. A quick disconnect system for use in a press, said press having first and second die shoes removably mounted thereto, and at least one fastener installation means operatively mounted to said first die shoe with said installation means being supplied fasteners from a remote source of fasteners and power from a remote power source; said quick disconnect system comprising:
at least one receptacle means having a first fastener flow path therein communicating with said source of fasteners and at least one power outlet means communicating with said power source, said receptacle means and power outlet being operatively mounted in said press;
at least one plug means having a second flow path communicating with the installation means and at least one power inlet means communicating with the installation means both mounted in the first die shoe;
the plug and inlet means engaging the receptacle and outlet means to supply fasteners and power to the installation means;
whereby with the one die shoe mounted to the press, the source of fasteners and power is connected to the installation means and with the first die shoe removed from the press, the source of fasteners and power is disconnected.

* * * * *